No. 866,157. PATENTED SEPT. 17, 1907.
J. McGILL.
COOKING UTENSIL.
APPLICATION FILED MAY 17, 1907.
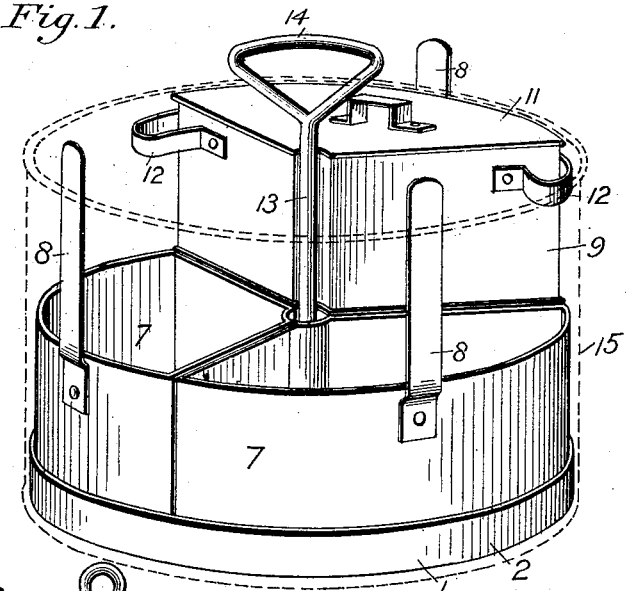
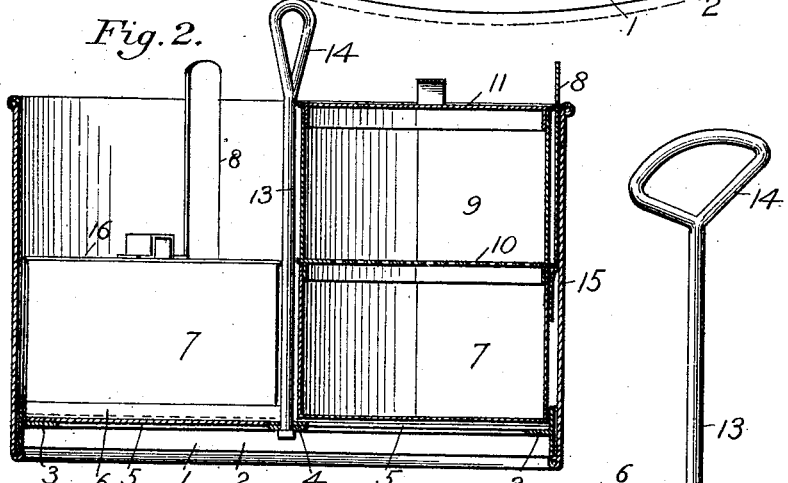
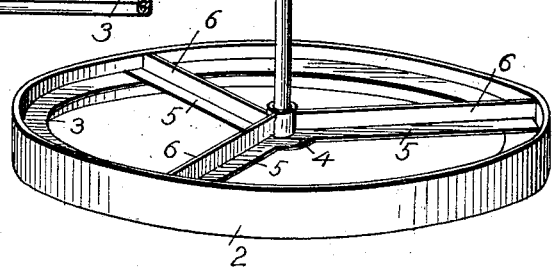
Witnesses
F. L. Ourand
C. H. Griesbauer
Inventor
JENNIE McGILL
by H. B. Willson & Co
Attorneys

UNITED STATES PATENT OFFICE.

JENNIE McGILL, OF CHICAGO, ILLINOIS.

COOKING UTENSIL.

No. 866,157.  Specification of Letters Patent.  Patented Sept. 17, 1907.

Application filed May 17, 1907. Serial No. 374,218.

*To all whom it may concern:*

Be it known that I, JENNIE McGILL, a subject of the King of Great Britain, residing at Chicago, in the county of Cook and State of Illinois, have invented certain new and useful Improvements in Cooking Utensils; and I do declare the following to be a full, clear, and exact description of the invention, such as will enable others skilled in the art to which it appertains to make and use the same.

My invention has relation to new and useful improvements in cooking utensils, and it consists in the improved construction and arrangement of parts hereinafter described and set forth, whereby an article is provided with a base frame, a plurality of cooking receptacles, a steamer adapted to fit over one of said receptacles, and a hollow cylinder adapted to inclose or surround said mentioned parts.

In the accompanying drawings,—Figure 1 is a perspective view of my improved cooking utensil, the covers of two of the cooking receptacles and the inclosing cylinder removed; Fig. 2 is a central cross sectional view of my invention; and Fig. 3 is a perspective view of the supporting base frame and handle.

Referring more particularly to the drawings, the numeral 1 represents the supporting base frame of my improved cooking utensil which comprises an annular body 2 of suitable width and thickness, provided on its inner face at a suitable point between its edges with a horizontal annular ledge or flange 3. Extending from the inner edge of said horizontal annular ledge or flange 3 at their outer ends and terminating in a central enlarged portion 4 at their inner or opposite ends are three or more horizontal radial arms or members 5, having secured to or formed on their upper faces longitudinal flanges 6, which divide said supporting base frame 1 into a number of parts corresponding with the number of said arms or members 5. The numeral 7 represents a plurality of triangular cooking receptacles which are arranged on said frame between the longitudinal flanges 6 of said horizontal radial arms or members 5 and are provided with suitable handles 8, by means of which they may be placed in or removed from position. A triangular steamer 9, having a perforated bottom 10, a suitable cover 11, and suitable handles 12, is adapted to fit over one of said triangular cooking receptacles 7. The numeral 13 represents an upright stem, which is secured at its lower end in any suitable substantial manner to said central enlarged portion 4, and is provided at its upper or opposite end with a suitable handle 14, by means of which the supporting base frame 1 may be moved from place to place. The numeral 15 represents a hollow inclosing cylinder, which is adapted to surround or inclose all of said mentioned parts, and serves to confine the heat when the utensil is in use.

My improved cooking utensil is of such novel construction that it may be used to boil and steam food at the same time. Should it be found desirous said steamer 9 may be removed from position, and all of the cooking receptacles used for boiling purposes, in which case they are supplied with suitable covers 16, (see Fig. 2.)

From the foregoing description, taken in connection with the drawings, the construction and operation of my invention will be understood without a more expanded explanation.

Having described my invention, what I claim as new and desire to secure by Letters Patent is:—

1. In a cooking utensil, a supporting base frame comprising a body having a horizontal ledge on its inner face and a plurality of radial arms extending from the inner edge of said ledge and having their inner ends united, an upright stem attached at its lower end to the meeting ends of the arms and provided at its upper end with a handle portion, a plurality of cooking receptacles corresponding in number with the number of said arms and arranged on the frame, a steamer fitting over one of said receptacles, and a hollow inclosing cylinder adapted to inclose said mentioned parts.

2. In a cooking utensil, the combination of a supporting base frame comprising an annular body having a horizontal ledge on its inner face and three horizontal radial arms extending from the inner edge of its horizontal ledge at their outer ends and terminating at their opposite ends in a central enlarged portion, an upright stem secured at its lower end to the center of said supporting base frame and terminating at its opposite end in a handle, a plurality of cooking receptacles corresponding in number with the number of horizontal radial arms of said base frame, arranged on said frame, a steamer fitting over one of said cooking receptacles, and a hollow inclosing cylinder inclosing said mentioned parts.

In testimony whereof I have hereunto set my hand in presence of two subscribing witnesses.

JENNIE McGILL.

Witnesses:
JAMES W. HOWELL,
FRANK KLEINER.